(12) United States Patent
Dweck et al.

(10) Patent No.: US 7,191,185 B2
(45) Date of Patent: Mar. 13, 2007

(54) SYSTEMS AND METHODS FOR FACILITATING ACCESS TO DOCUMENTS VIA AN ENTITLEMENT RULE

(75) Inventors: Jay S. Dweck, Armonk, NY (US); Reha Elci, New York, NY (US); Warren P. Finnerty, Plainfield, NJ (US)

(73) Assignee: Goldman Sachs & Co., New York, NY (US)

( * ) Notice: Subject to any disclaimer, the term of this patent is extended or adjusted under 35 U.S.C. 154(b) by 534 days.

(21) Appl. No.: 10/084,824

(22) Filed: Feb. 26, 2002

(65) Prior Publication Data

US 2003/0084021 A1    May 1, 2003

Related U.S. Application Data

(63) Continuation-in-part of application No. 10/016,674, filed on Oct. 30, 2001, now Pat. No. 6,970,870, and a continuation-in-part of application No. 10/016,673, filed on Oct. 30, 2001.

(51) Int. Cl.
*G06F 17/00* (2006.01)
*G06F 9/44* (2006.01)

(52) U.S. Cl. .................. 707/102; 707/10; 707/101; 707/103 Y; 707/104.1; 705/7

(58) Field of Classification Search .............. 707/3, 707/10, 101, 102, 103 Y, 104.1; 705/7, 35, 705/37, 1, 3
See application file for complete search history.

(56) References Cited

U.S. PATENT DOCUMENTS

| 5,568,640 | A | 10/1996 | Nishiyama et al. |
|---|---|---|---|
| 5,737,739 | A | 4/1998 | Shirley et al. |
| 5,864,871 | A | 1/1999 | Kitain et al. |
| 6,029,195 | A | 2/2000 | Herz |
| 6,058,378 | A * | 5/2000 | Clark et al. ............ 705/37 |
| 6,067,552 | A | 5/2000 | Yu |
| 6,098,066 | A | 8/2000 | Snow et al. |
| 6,175,830 | B1 | 1/2001 | Maynard |
| 6,282,547 | B1 | 8/2001 | Hirsch |
| 6,336,094 | B1 * | 1/2002 | Ferguson et al. ......... 705/1 |

(Continued)

FOREIGN PATENT DOCUMENTS

EP    0 860 763 A1    8/1998

OTHER PUBLICATIONS

Microsoft Computer Dictionary, Fourth Edition, pp. 338 & 374-375. 1999. Microsoft Press.*

(Continued)

*Primary Examiner*—Thuy N. Pardo
(74) *Attorney, Agent, or Firm*—Buckley, Maschoff & Talwalkar LLC

(57) ABSTRACT

Systems and methods are provided to facilitate access to documents via one or more entitlement rules. According to one embodiment, a document tag associated with a document is determined. For example, a content controller may determine a document tag based on information received from a content publisher. A content selection tag associated with a content reader is also determined. It is then arranged for the content reader to receive information associated with the document based on the document tag, the content selection tag, and one or more entitlement rules.

26 Claims, 15 Drawing Sheets

U.S. PATENT DOCUMENTS

| | | | |
|---|---|---|---|
| 6,360,215 | B1 | 3/2002 | Judd et al. |
| 6,735,585 | B1* | 5/2004 | Black et al. ................... 707/3 |
| 2001/0016846 | A1 | 8/2001 | Chakrabarti et al. |
| 2001/0049675 | A1 | 12/2001 | Mandler et al. |
| 2002/0129062 | A1 | 9/2002 | Luparello |
| 2002/0138582 | A1* | 9/2002 | Chandra et al. ............ 709/206 |
| 2003/0110106 | A1* | 6/2003 | Deshpande et al. ........... 705/35 |
| 2004/0107125 | A1* | 6/2004 | Guheen et al. ................ 705/7 |
| 2005/0097017 | A1* | 5/2005 | Hanratty ..................... 705/35 |

OTHER PUBLICATIONS

Skiena, Steven, S. "The Algorithm Design Manual" 1998, Telos Press, pp. 176-177.*

Damiani, E.; De Capitani di Vimercati; Paraboschi, S.; Samarati, P.; "Design and Implementation of an Access Control Processor fro XML Documents"; Jun. 2000; Computer Networks, vol. 33; No. 1-6; pp. 59-75.*

"RIXML Specification Users Guide and Data Dictionary Report" Jun. 20, 2001, published by RIXML.org, 76 pages.*

Anick, Peter G. et al. "Addressing the Requirements of a Dynamic Corporate Textual Information Base", Proceedings of the Annual International ACM/SIGR Conference on Research and Development in Information Retrieval. Chicagp. Oct. 13-16, 1991, Vol. Conf. 14, Oct. 13, 1991, pp. 163-172, XP000239168.

"Supplementary European Search Report of the European Patent Office", mailed Jul. 24, 2006, for EP 02776130.3—2201 PCT/US0231729, 3 pgs.

"Tagging Concepts," www.SiteServer101.com (1999).

"Using Rules to Create Personalized Content," www.SiteServer101.com (1999).

Chandra Chekuri et al, "Web Search Using Automatic Classification," theory.stanford.edu (1996).

"Classification and Cataloging," www.nhse.org (1996).

* cited by examiner

| DOCUMENT IDENTIFIER 1002 | DESCRIPTION 1004 | PRIMARY TAGS 1006 | SECONDARY TAGS 1008 |
|---|---|---|---|
| D1001 | "MICROSOFT 2002 Q3" | US COMPANIES:SOFTWARE; US COMPANIES:SOFTWARE: MICROSOFT CORP.; REGION:UNITED STATES; REGION:UNITED STATES; NORTH WEST | AUTHOR: RICK SHERLUND |
| D1002 | "FORECAST CHART" | EQUITIES:TECHNOLOGY | NONE |
| D1003 | "KEYNOTE ADDRESS (VIDEO)" | US COMPANIES:AUTOMOTIVE; US COMPANIES:AUTOMOTIVE: FORD | NONE |

| ENTITLEMENT RULE IDENTIFIER 1202 | SUBJECT 1204 | ACTION 1206 | RESOURCE 1208 |
|---|---|---|---|
| ER1001 | READER CATEGORY: INSTITUTION | VIEW | DOCUMENT:D1001 |
| ER1002 | READER CATEGORY: INSTITUTION OR READER CATEGORY: CUSTOMER | VIEW | DOCUMENT:D1002 |
| ER1003 | READER CATEGORY: CUSTOMER AND REGION:ASIA | VIEW | REGION:ASIA |
| ER1004 | READER CATEGORY: ADMINISTRATOR | MODIFY | ALL |

| OUTPUT IDENTIFIER 1302 | CONTENT READER IDENTIFIER 1304 | ENTITLEMENT RULE IDENTIFIER 1306 | OUTPUT 1308 |
|---|---|---|---|
| OP1001 | CR1002 | ER1001; ER1002 | D1001; D1002 |
| OP1002 | CR1001 | ER1001; ER1002 | D1002 |

FIG. 13

SYSTEMS AND METHODS FOR FACILITATING ACCESS TO DOCUMENTS VIA AN ENTITLEMENT RULE

CROSS REFERENCE TO RELATED APPLICATIONS

The present invention is a continuation-in-part of U.S. patent application Ser. No. 10/016,674 entitled "Systems and Methods for Facilitating Access to Documents via Associated Tags" filed Oct. 30, 2001 now U.S. Pat. No. 6,970,870 and U.S. patent application Ser. No. 10/016,673 entitled "Systems and Methods for Facilitating Access to Documents via a Set of Content Selection Tags" filed Oct. 30, 2001. The entire contents of these applications are incorporated herein by reference.

FIELD

The present invention relates to systems and methods for facilitating access to documents. In particular, the present invention relates to systems and methods for facilitating access to documents via one or more entitlement rules.

BACKGROUND

A content provider can store information that will be made available to content readers. For example, a financial company might store hundreds of thousands of documents (e.g., investment reports, stock charts, and market predictions) that will be made available to customers via a Web site.

The content provider may also want to provide a content reader with information that will likely be of interest to that particular content reader. For example, one content reader may be interested in accessing documents associated with one industry while another content reader is interested in accessing documents associated with another industry.

To facilitate a content reader's ability to access information that will likely be of interest, it is known that a content provider can categorize information. For example, a content provider can associate a document with one or more "key" words. Similarly, a content provider can categorize information such that documents associated with one category (e.g., an "Automotive Industry" category) are associated with one branch of a directory structure while documents associated with another category (e.g., an "Airline Industry" category) are associated with another branch. In this way, a content reader can navigate through the directory structure and locate information that will likely be of interest.

There are a number of disadvantages, however, with these approaches. For example, a content reader may not be able to efficiently provide key words to the content provider (e.g., he or she might mistakenly request information associated with "US Corporations" as opposed to "US Companies") and/or be unable to effectively navigate through a directory structure to locate information that will likely be of interest (e.g., he or she may not realize that Daimler-Chrysler is associated with a "German Companies" directory as opposed to a "US Companies" directory). This may be particularly difficult when the information is associated with investment research due to the large number of potential types of investments, the frequency at which this kind of information changes (e.g., daily, weekly, or occasionally), and the importance of providing such information to customers in a timely manner.

In addition, a content reader's interests may not be easily categorized by simple key words and/or directory structures. For example, a content reader may only be interested in information about MICROSOFT® if the information was generated by a particular investment advisor. Similarly, a single content reader may be interested in a number of different types of information (e.g., associated with his or her different investments).

Moreover, a content provider may not want make all information available to every content reader. That is, the content provider may want to restrict particular content readers to a subset of the information that might be otherwise available. For example, a content reader might provide payment to the content provider in order to access additional information. Similarly, important customers may be given enhanced access to information, or content readers in a particular geographic region may be allowed to access information different from what is available to content readers in other regions.

Such an attempt to limit the information that can be accessed some content readers may be inefficient. Consider a content reader who asks to receive ten articles associated with a particular investment. In this case, the content provider may search through a large amount of information and generate a list of ten articles associated with that investment. After further reviewing these articles, however, the content provider determines that the content reader does not have access to seven of those articles. As a result, the content provider needs to resume searching for additional articles. Such an approach may be time consuming and resource-intensive for the content provider, especially when a large number of articles, content readers, and/or requests are involved.

SUMMARY

To alleviate problems inherent in the prior art, the present invention introduces systems and methods for facilitating access to documents via one or more entitlement rules.

According to one embodiment, a document tag associated with a document is determined. A content selection tag associated with a content reader is also determined, and it is arranged for the content reader to receive information associated with the document based on the document tag, the content selection tag, and at least one entitlement rule.

According to another embodiment, a document tag associated with an investment research document is determined. A content selection tag associated with a content reader is also determined. An entitlement tag is then determined associated with the investment research document, the document tag, the content reader, and/or a content reader tag. The investment research document may then be transmitted to the content reader (e.g., via a communication network) in accordance with the entitlement tag.

In still another embodiment, a document is received from a content publisher. A document tag and an entitlement rule associated with the document are then determined.

One embodiment of the present invention comprises: means for determining a document tag associated with a document; means for determining a content selection tag associated with a content reader; and means for arranging for the content reader to receive information associated with the document based on the document tag, the content selection tag, and at least one entitlement rule.

Another embodiment comprises: means for determining a document tag associated with an investment research document; means for determining a content selection tag associated with a content reader; means for determining an entitlement tag associated with the investment research document, the document tag, the content reader, and/or a content reader tag; and means for transmitting the investment research document to the content reader via a communication network in accordance with the entitlement tag.

Still another embodiment comprises: means for receiving a document from a content publisher; means for determining a document tag associated with the document; and means for determining an entitlement rule associated with the document.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 13 is a tabular representation of a portion of an output database according to one embodiment of the present invention.

DETAILED DESCRIPTION

Embodiments of the present invention are directed to systems and methods for facilitating access to "documents."

As used herein, the term "document" may refer to any content that can be provided to a content reader via a communication network. A document may include, for example, text information, image information (e.g., photographic and video images), audio information, and/or executable information (e.g., a Java program). Note that a document's content could be manually or automatically created. For example, a document may be written by an author or generated by software program. In addition, a document's content could be associated with any type of information, including financial information (e.g., financial news and information about financial events), investment information, and/or market information.

Moreover, the phrase "content publisher" as used herein may be any person or device that generates or supplies documents. A content publisher may be associated with, for example, an author who writes a market summary or an automated process that generates investment charts. Similarly, the phrase "content reader" as used herein may be any person or device that receives documents. A content reader may be associated with, for example, a customer who accesses documents via an Internet portal. Note that a content "reader" may receive documents including any type of information described herein (e.g., a content reader may listen to audio information, view image information, and/or execute a Java program).

Content Management System Overview

Figure 1:
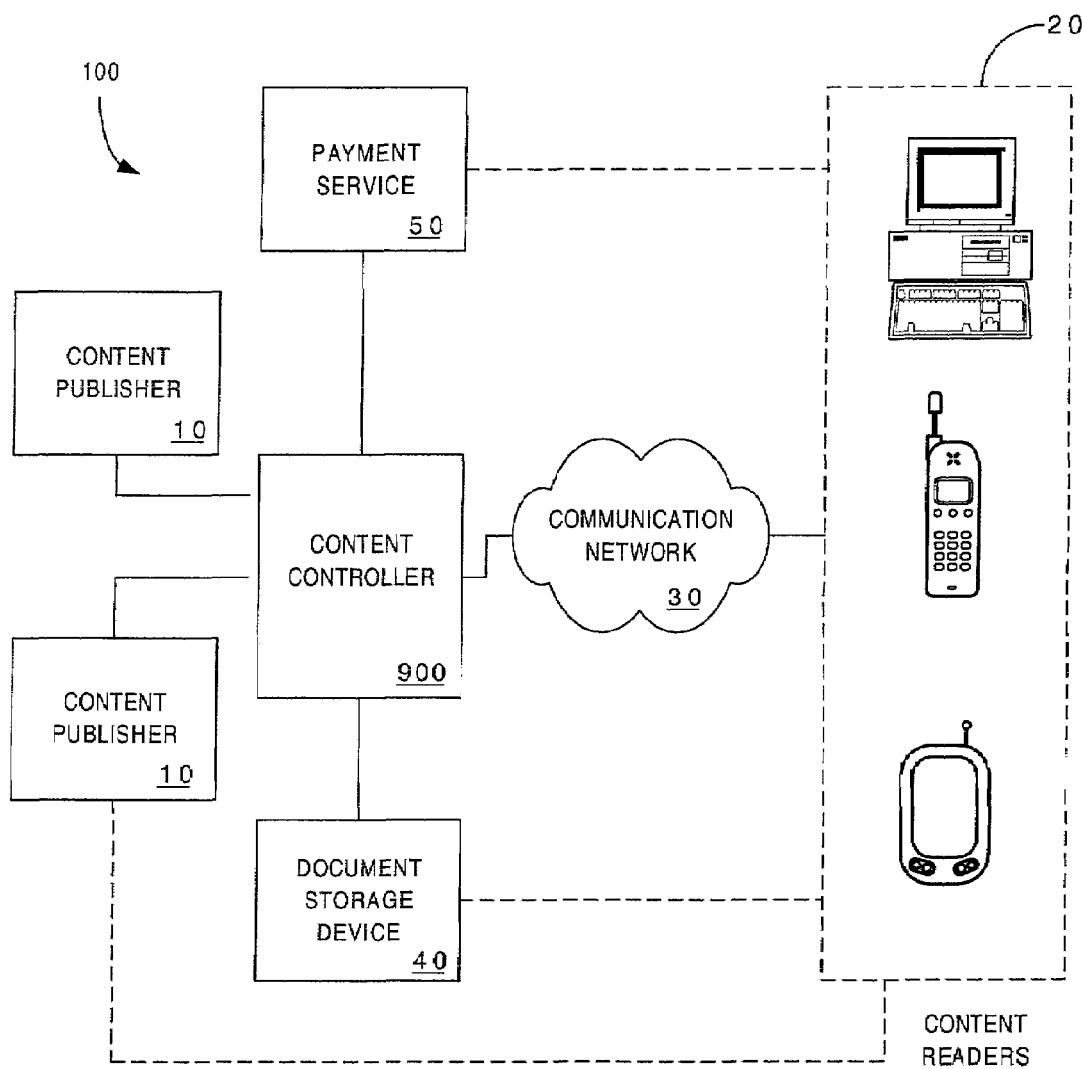
FIG. 1 is a block diagram overview of a content management system according to an embodiment of the present invention.

FIG. 1 is a block diagram of a content management system 100 according to one embodiment of the present invention. The content management system 100 includes a content controller 900 in communication with a number of content publishers 10 and content readers 20. As used herein, devices (e.g., the content controller 900 and the content readers 20) may exchange information, for example, via a communication network 30, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network (e.g., in accordance with an 802.11 standard), and/or an Internet Protocol (IP) network such as the Internet, an intranet, or an extranet. Note that the content controller 900 and the content publishers 10 can also communicate via one or more such communication networks.

Although a single content controller 900 is shown in FIG. 1, any number of content controllers 900 may be included in the content management system 100. Similarly, any number of content publishers 10, content readers 20, or any other device described herein may be included in the content management system 100 according to embodiments of the present invention.

The content controller 900, the content publishers 10, and the content readers 20 may be associated with any devices capable of performing the various functions described herein. The content controller 900 may comprise, for example, a Web server. A content reader 20 may be associated with, for example: a Personal Computer (PC), a portable computing device such as a Personal Digital Assistant (PDA), a wired or wireless telephone, or any other appropriate storage and/or communication device. A content publisher 10 may be associated with, for example, a Web server or a PC.

The content management system 100 may also include a document storage device 40, such as a local, remote, or distributed database system adapted to store a large number of documents.

According to an embodiment of the present invention, the content controller 900 receives documents from a number of different content publishers 10. For example, a content creator (e.g., an author or an automated process) may transmit documents to the content controller 900 via a content publisher 10. The content controller 900 also transmits documents to content readers 20 (e.g., in response to a customer's request or a pre-defined customer preference). According to some embodiments, a content reader 20 instead receives a document directly from a content publisher 10 and/or the document storage device 40 (e.g., after receiving a relevant document identifier or link from the content controller 900). In either case, a document may be transmitted to a content reader 20, for example, via a Web site or an electronic mail message.

The content management system 100 may also include a payment service 50 (e.g., a credit card payment service) that can be used to arrange for a content reader 20 to provide payment in exchange for documents or in exchange for having his or her access to documents facilitated via the content management system 100. For example, a content reader 20 interested in having access to enhanced information may provide a monthly subscription payment via a payment identifier such as a credit card, debit card, or bank account number or digital payment protocol information.

Note that some of devices illustrated in FIG. 1 may actually be incorporated in a single device. For example, the content controller 900 may also act as a content publisher 10 and/or a document storage device 40.

Tag Domains

According to some embodiments of the present invention, documents available via the content management system 100 and/or content readers 20 are associated with one or more tags. As used herein, the term "tag" refers to any information, such as an identifier, that may be used to categorize information associated with the content management system 100.

Figure 2:
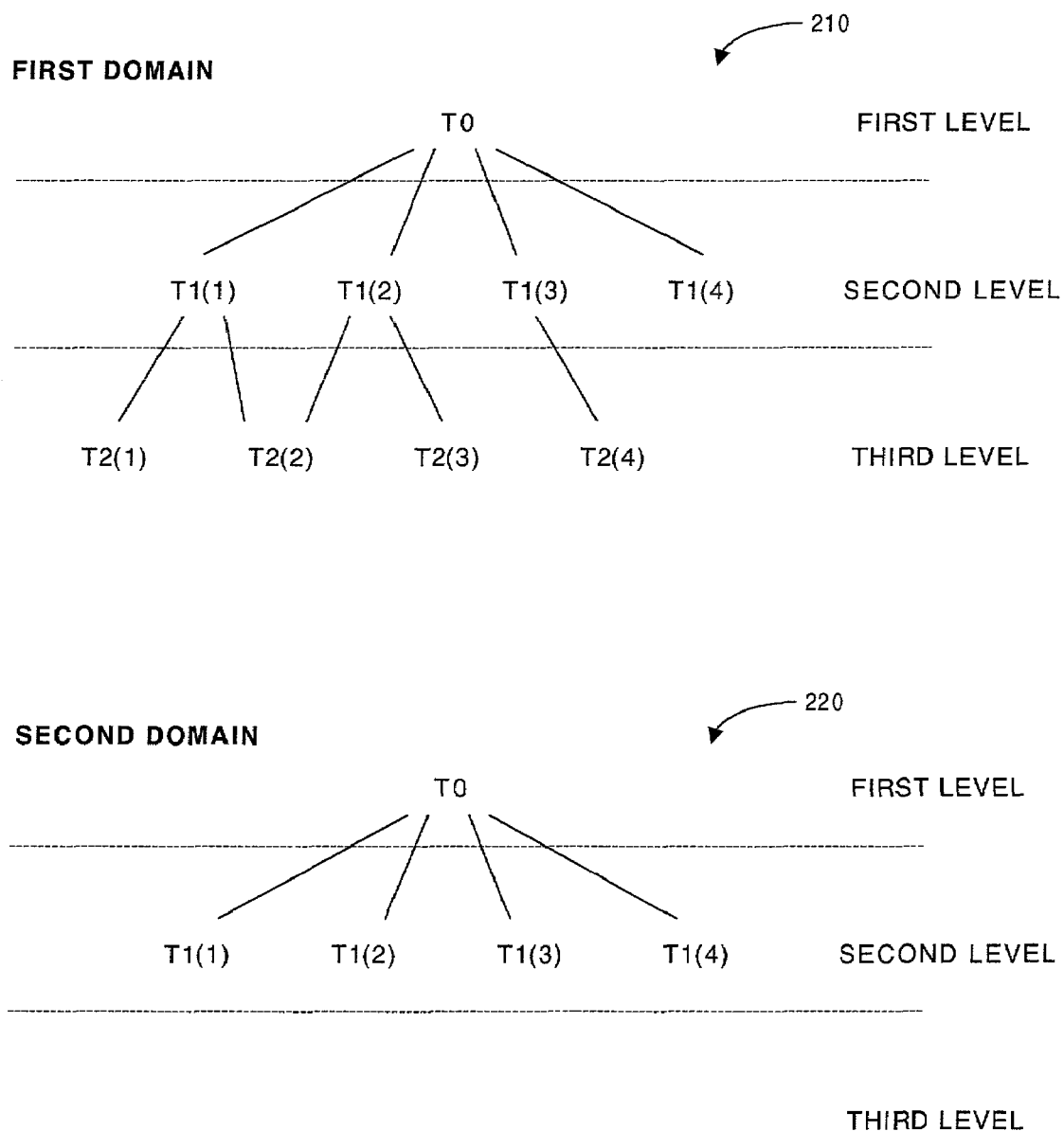
FIG. 2 illustrates tag domains according to some embodiments of the present invention.

According to one embodiment, a tag is associated with a tag "domain," such as a single-rooted, hierarchical data structure. FIG. 2 illustrates two tag domains 210, 220 according to some embodiments of the present invention. Although only a small number of tags are shown, any number of tags and/or tag domains may be defined by the content controller 900.

As can be seen, the first tag domain 210 includes three levels. The first level includes a single tag (i.e., tag "T0") that has four descendent tags (i.e., child tags) in the second level: T1(1), T1(2), T1(3), and T1(4). Moreover, some of those second level tags have children in the third level. For example, tag T1(1) has two child tags in the third level: T2(1) and T2(2). Note that a tag may have more than one antecedent tag (e.g., parent tags). For example, tag T2(2) has both tag T1(1) and tag T1(2) as parent tags. In addition, a tag may not have any child tags. For example, tag T1(4) in the second level does not have any child tag in the third level.

As another example, the second tag domain 220 is "flat." That is, the entire domain consists of a single parent tag (i.e., tag "T0") and a number of child tags.

Although generic information is shown in FIG. 2, an actual tag or tag domain may be related to, for example: a document, a content reader 20, and/or a rule indicating sets of documents that may be accessed by sets of content readers 20.

Document Tags

Figure 3:
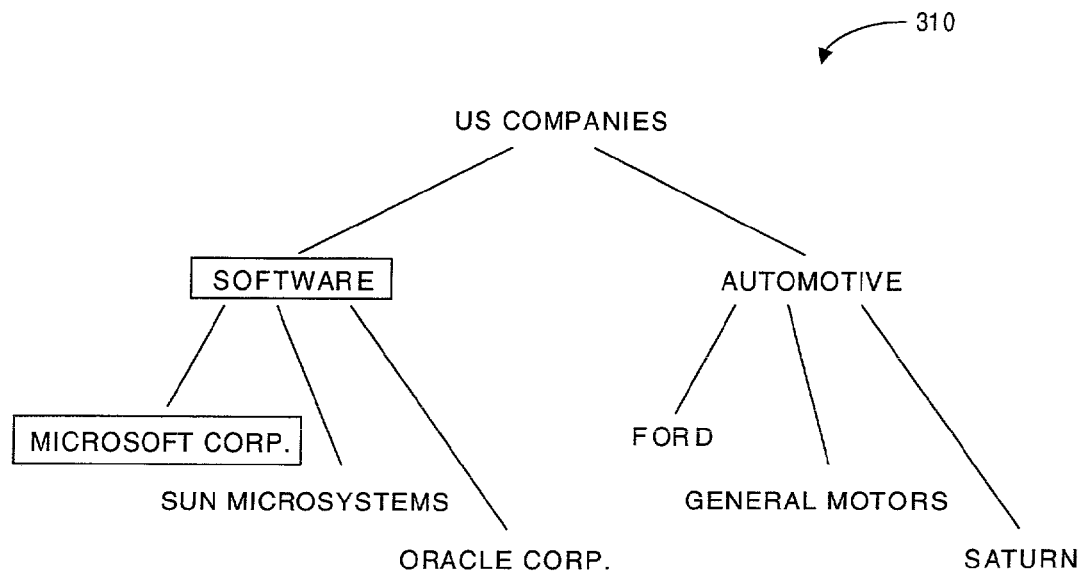
FIG. 3 illustrates an example of tag domains and a set of document tags according to one embodiment of the present invention.
Figure 3:
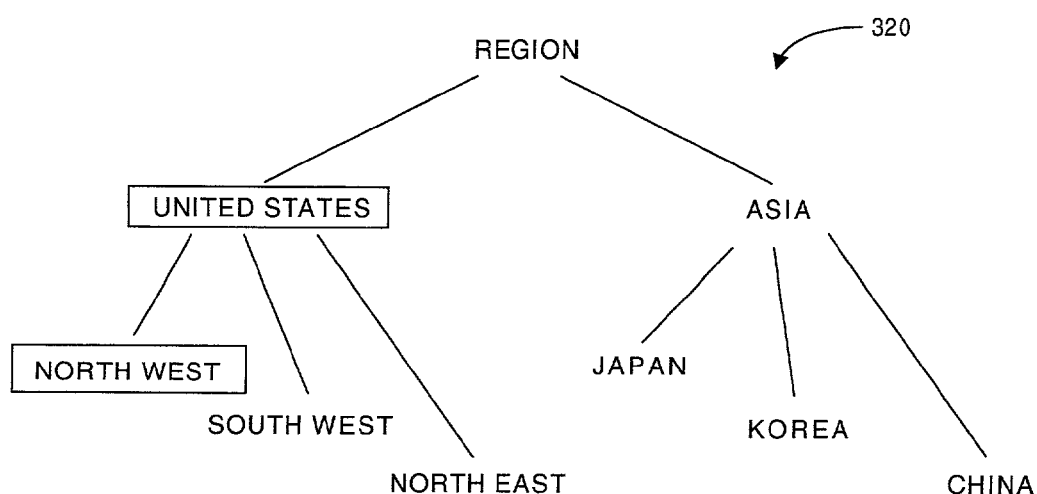

FIG. 3 illustrates an example of tag domains 310, 320 and a set of document tags according to one embodiment of the present invention. In particular, the first tag domain 310 relates to US companies and the second tag domain relates to geographic regions that are associated with a document, respectively. For example, as indicated by boxes, the document illustrated in FIG. 3 is related to "software" and "MICROSOFT® CORP." Moreover, the document is associated with the "United States" and "North West" regions. In effect, the documents tags and tag domains 310, 320 are a way of grouping like content together.

As another example, documents tags may be related to a document creator or publisher. Similarly, a document tag may be associated with a date on which a document's content was created or a content type. For example, a document tag may indicate whether a document was automatically generated or manually written by an author. A document tag might instead indicate whether a document includes image information or whether a document is appropriate for hand-held content readers 20.

A document tag may also indicate the nature of a document's content. For example, a tag may indicate that a document is related to a particular sector (e.g., the technology sector), an industry (e.g., the German automotive industry), a research type, an issuer, an investment product, a security instrument, a third-party rating (e.g., a Moody's Investors Service rating), a research analyst, a strategist, an event type (e.g., an investor conference call), a subject, an investment style (e.g., value-based investing), a market cap, a content type, an information value, and/or a currency.

A document tag may also reflect other information about a document. For example, a document tag may indicate a change frequency (e.g., how often the document is normally updated), a business owner, a technology owner, a data source (e.g., a database identifier), and/or a change process (e.g., indicating that any change must be approved by an appropriate business owner).

The content controller 900 may assign a document tag to a document after receiving the document from a content publisher 10 along with an indication of an appropriate document tag. That is, the content publisher 10 (or a tag assignor associated with the content publisher 10) may determine the appropriate document tags (e.g., by selecting one or more tag descriptions via a graphical user interface). In this case, the content controller 900 can simply assign document tags to the document based on indications received from the content publisher 10.

Figure 4:
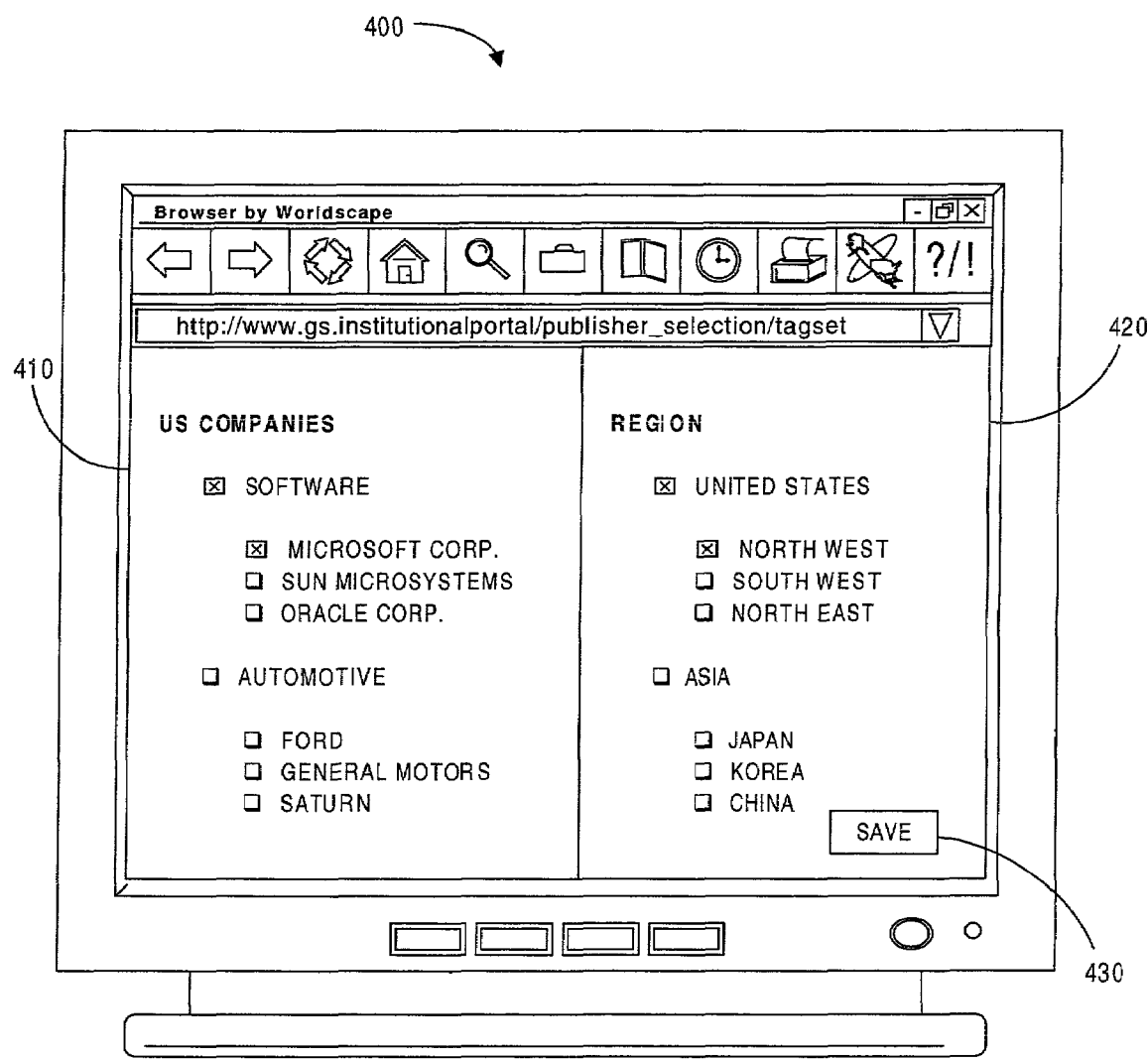
FIG. 4 illustrates a content publisher display that may be used to define a set of document tags in accordance with some embodiments of the present invention.

FIG. 4 illustrates a content publisher display 400 that may be used to define a set of document tags in accordance with some embodiments of the present invention. In this case, a content publisher 10 uses the graphical user interface to check one or more document tags that are applicable to a document. In particular, the display 400 includes two tag selection areas 410, 420—each being associated with a particular tag domain (i.e., a "US Companies" tag domain and a "Region" tag domain, respectively). According to this embodiment, the tag selection areas 410, 420 are used to indicate the content of a particular document. For example, selecting the "MICROSOFT® CORP." tag in the "US Companies" tag domain (i.e., as indicated by an "X" in FIG. 4) indicates that the document is somehow related to that company.

According to one embodiment, the selection of a particular tag does not automatically alter other tag selections (e.g., parent tags, sibling tags, and child tags). In such a case, selection of the "United States" tag would not automatically select the "North West" tag (nor would selection of the "North West" tag automatically select the "United States" tag). According to another embodiment, the selection of a particular tag does automatically alter other tag selections.

For example, selecting an "Asia" tag may automatically select a set of child tags (e.g., including a "China" tag). Note that the altered tag selection might be associated with a different tag domain. For example, selection of the "SUN MICROSYSTEMS®" tag in the "US Companies" tag domain could automatically result in selection of the "United States" tag in the "Region" tag domain. The display 400 also includes a save icon 430 that can be used to transmit the set of selected document tags from the content publisher 10 to the content controller 900.

According to another embodiment, the content controller 900 does not receive an indication of an appropriate document tag from the content publisher 10. In this case, the content controller 900 may determine one or more document tags. For example, a tag assignor associated with the content controller 900 may review the document to determine appropriate document tags. According to another embodiment, an automated process is used to automatically determine document tags (e.g., based on a key word analysis of the document's content).

According to one embodiment, a document tag can be associated with a document in different ways. For example, a document tag may be designated as a "primary" tag (e.g., indicating that the tag is an important subject of the document) or a "secondary" tag (e.g., indicating that tag is only somewhat related to the document).

Note that a plurality of document tags can be assigned to a single document, and these tags may belong to one or more tag domains. For example, a single document tag from an author tag domain (e.g., a "Rick Sherlund" tag) and three document tags from an industry tag domain (e.g., "Technology," "Software," and "Operating Systems" tags) could be assigned to a single document.

Content Reader and Selection Tags

Figure 5:
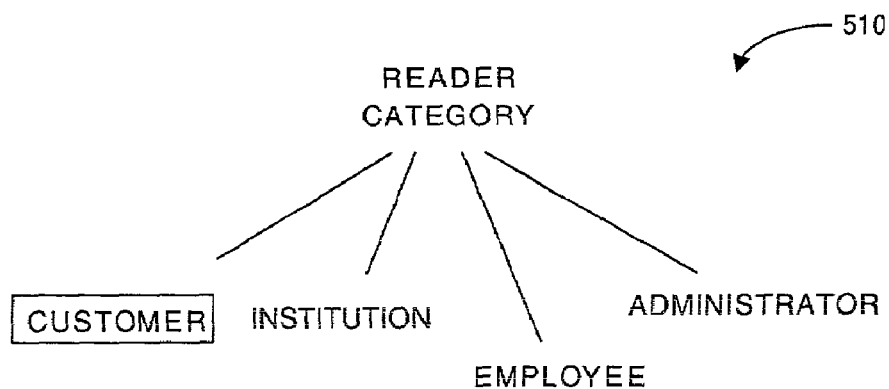
FIG. 5 illustrates an example of tag domains and a set of content reader tags according to one embodiment of the present invention.
Figure 5:
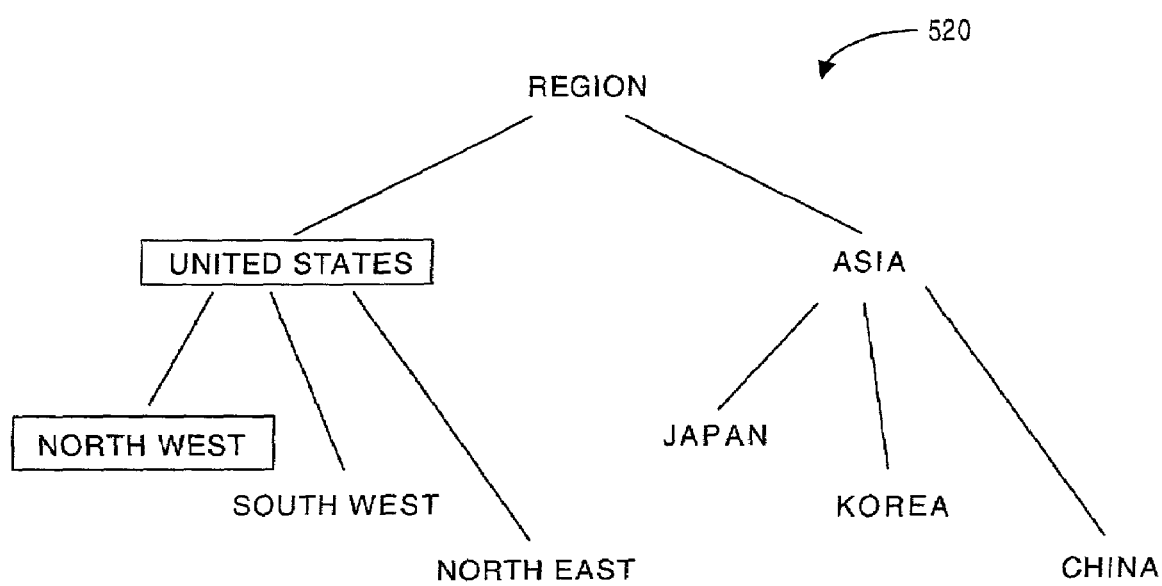

In addition to document tags, the content management system 100 may use content reader tags to facilitate access to documents. FIG. 5 illustrates an example of tag domains and a set of content reader tags according to one embodiment of the present invention. In particular, the first tag domain 510 represents a reader category (e.g., indicating that the content reader is a "customer" or an "employee") and the second tag domain 520 represents a region (e.g., indicating that the content reader 20 is located in the "United States" or "Asia"). In effect, the content reader tags are and tag domains 510, 520 are a way of grouping like content readers 20 together. According to one embodiment, content reader tags are created by the content controller 900 (e.g., based on information provided by a content reader 20 when registering to use the content management system 100).

Figure 6:
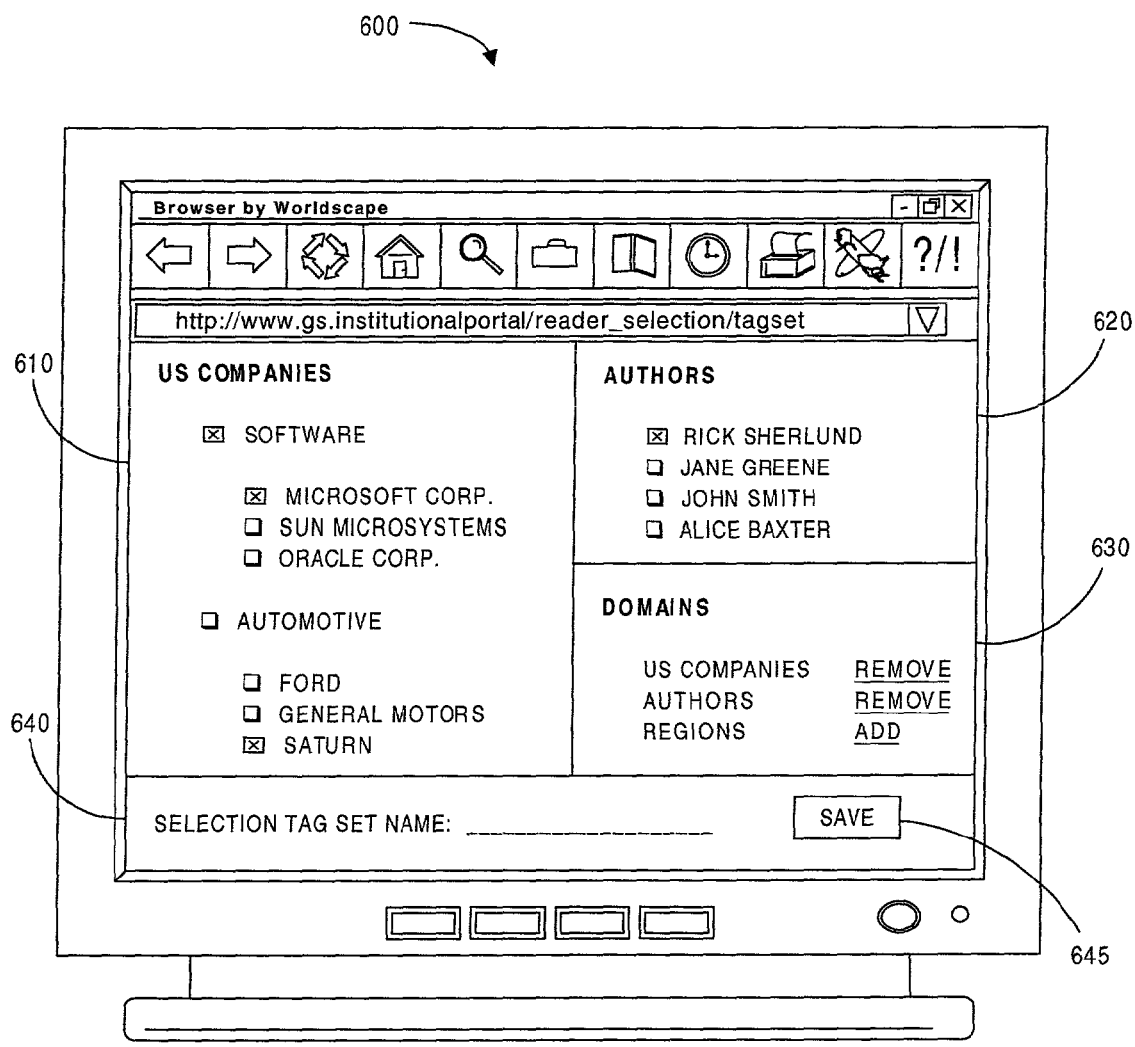
FIG. 6 illustrates a content reader display that may be used to define a set of content selection tags in accordance with some embodiments of the present invention.

According to another embodiment, content reader tags are created by a content reader 20 (e.g., when the content reader 20 searches for particular documents of interest). For example, FIG. 6 illustrates a content reader display 600 that may be used to define a set of content selection tags. In particular, the display 600 includes two tag selection areas 610, 620—each being associated with a particular tag domain (i.e., a "US Companies" tag domain and an "Authors" tag domain, respectively). According to this embodiment, the tag selection areas 610, 620 are used to indicate the types of documents that are of interest to a content reader 20. For example, selecting the "SATURN®" tag in the "Automotive" tag domain (i.e., as indicated by an "X" in FIG. 6) indicates that documents associated with SATURN® are of interest to the content reader 20.

According to one embodiment, the selection of a particular tag does not automatically alter other tag selections (e.g., parent tags, sibling tags, and child tags). In such a case, selection of the "Automotive" tag would not automatically select the "FORDS" tag (nor would selection of the "FORD®" tag automatically select the "Automotive" tag). According to another embodiment, the selection of a particular tag will automatically alter other tag selections. For example, selecting a "North America" tag may automatically select a set of child tags (e.g., including a "Canada" tag). Note that the altered tag selection might be associated with a different tag domain. For example, selection of the "Rick Sherlund" tag in the "Authors" tag domain could automatically result in selection of the "MICROSOFT®" tag in the "US Companies" tag domain.

The display 600 also includes a tag domain selection area 630 that can be used to add or remove tag selection areas from the display 600 (e.g., selecting "add" for the "Region" tag domain would result in a third tag selection area being added to the display 600).

According to one embodiment, predetermined rules are used to define relationships between content selection tags. For example, tags within a domain may automatically be associated with a Boolean "OR" while tags from different domains may be associated with a Boolean "AND." In this case, the selections illustrated in FIG. 6 would be interpreted as follows:

("Software" OR "MICROSOFT®" OR "SATURN®") AND "Rick Sherlund"

According to another embodiment, these types of rules are instead be defined by a content reader 20. Note that relationships other than Boolean operations may be associated with the content selection tags (e.g., "if no document having Tag A is found, then display the three most recent documents that have Tag B without having Tag C").

According to some embodiments, a set of content selection tags is stored in association with the content reader 20. The set may be stored, for example, at the content controller 900 and/or at the content reader 20 (e.g., via a browser program "cookie" file). Referring again to FIG. 6, the display 600 includes a storage frame 640 that can be used to store a set of content reader selections (e.g., by providing a tag set name and activating a "save" icon 645). In this way, the set of content selection tags can later be used to select document for the content reader 20. In addition, the content reader 20 can access the set of content selection tags to modify the information and/or completely delete the content selection tag set. Moreover, a single content reader 20 may be associated with a number of different sets of content selection tags (e.g., each saved with a unique tag set name).

Entitlement Tags and Rules

Figure 7:
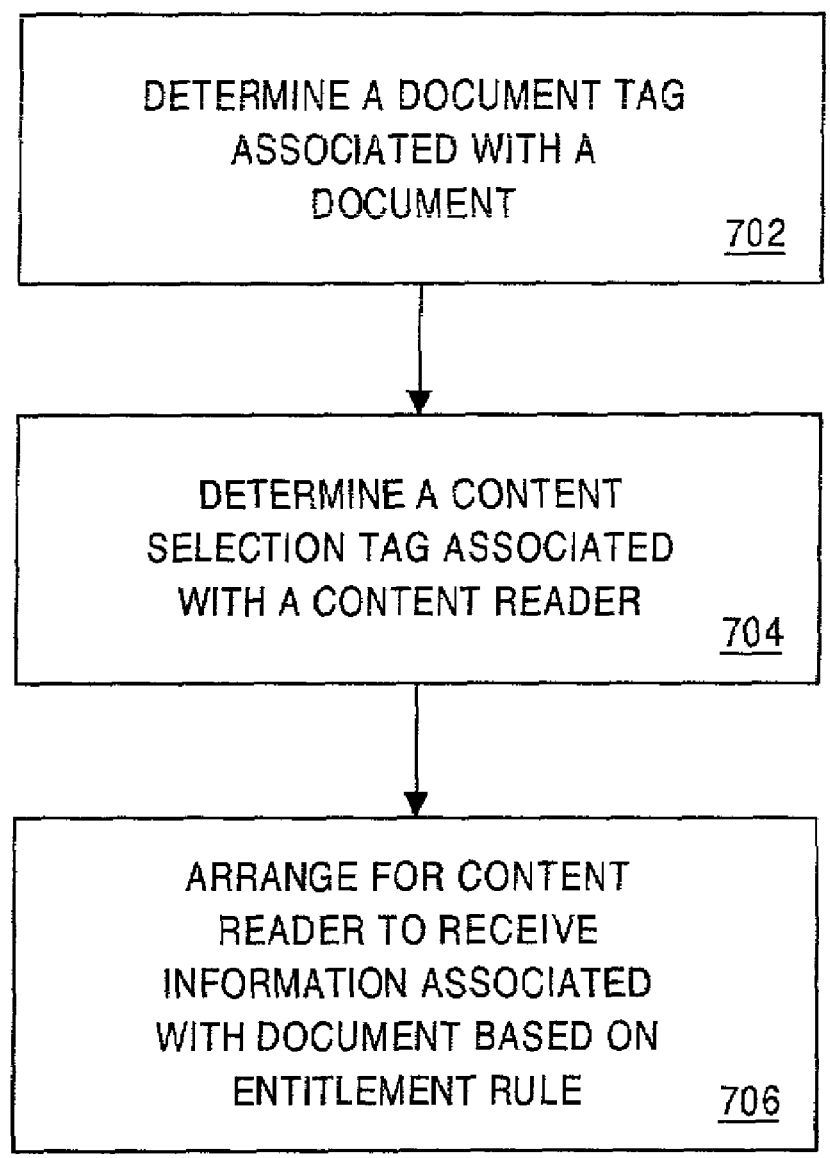
FIG. 7 is a flow chart of a method according to some embodiments of the present invention.

FIG. 7 is a flow chart of a method that may be performed by the content controller 900 according to some embodiments of the present invention. The flow charts described herein do not imply a fixed order to the steps, and embodiments of the present invention may be practiced in any order that is practicable.

At 702, a document tag associated with a document is determined. For example, the content controller 900 may determine the document tag (e.g., a primary or secondary document tag) based on information retrieved from a database or information received from a content publisher 10 via a graphical user interface (e.g., as described with respect to FIG. 4).

At 704, a content selection tag associated with a content reader 20 is determined. For example, the content controller 900 may determine the content selection tag based on information retrieved from a database (e.g., a content reader's pre-stored preferences) or information received from a content reader 20 via a graphical user interface (e.g. as described with respect to FIG. 6). According to another embodiment, a content reader tag associated with the content reader 20 is determined instead of, or in addition to, the content selection tag.

At 706, it is arranged for the content reader 20 to receive information associated with the document based on the document tag, the content selection tag (or content reader tag), and at least one "entitlement rule." As used herein, the phrase "entitlement rule" refers to any information that can be used to define or otherwise indicate documents that may be accessed by particular content readers 20.

According to one embodiment, an entitlement rule includes: (i) an entitlement subject, (ii) an entitlement resource, and (iii) an entitlement action. The entitlement subject may be associated with a group of content readers 20. For example, the entitlement subject may be defined via one or more content reader tags (e.g., all content readers having a reader category of "institution").

The entitlement resource may be associated with at least one document. For example, the entitlement resource may be defined via one or more document tags (e.g., all documents having a region of "Asia" or "Japan") or particular document identifiers.

The entitlement action may, for example, indicate that a content reader 20 should be able to receive an indication of a document, receive a document, modify a document, and/or delete a document. By way of example, an entitlement rule might state that all content readers 20 who are brokers located in the United States (i.e., the entitlement subject) are allowed to view (i.e., the entitlement action) all investor conference call transcript (i.e., the entitlement resource).

Such an entitlement rule may be determined by the content controller 900, for example, based on information received from a content publisher 10. For example, a content publisher 10 may indicate which content readers 20 should be allowed to access a document. The content controller 900 may also determine the appropriate entitlement rule based on one or more pre-defined relationships. For example, the content controller 900 may automatically assign a particular entitlement rule to a document generated by a particular author. According to another embodiment, the content controller 900 analyzes a document's content to determine an appropriate entitlement rule. According to still another embodiment, an administrator associated with the content controller 900 defines entitlement rules to be used in the content management system 100.

Note that an entitlement rule may be inclusive (e.g., these types of content readers are allowed to access this document) or exclusive (e.g., these types of content readers are not allowed to access this document). Also note that more than one entitlement rule may be associated with a single document. In this case, some entitlement rules may be dominant (e.g., these types of content readers can access this document no matter what other entitlement rules indicate) while others are submissive (e.g., these types of content readers can to access this document unless another entitlement rule indicates otherwise).

Figure 8:
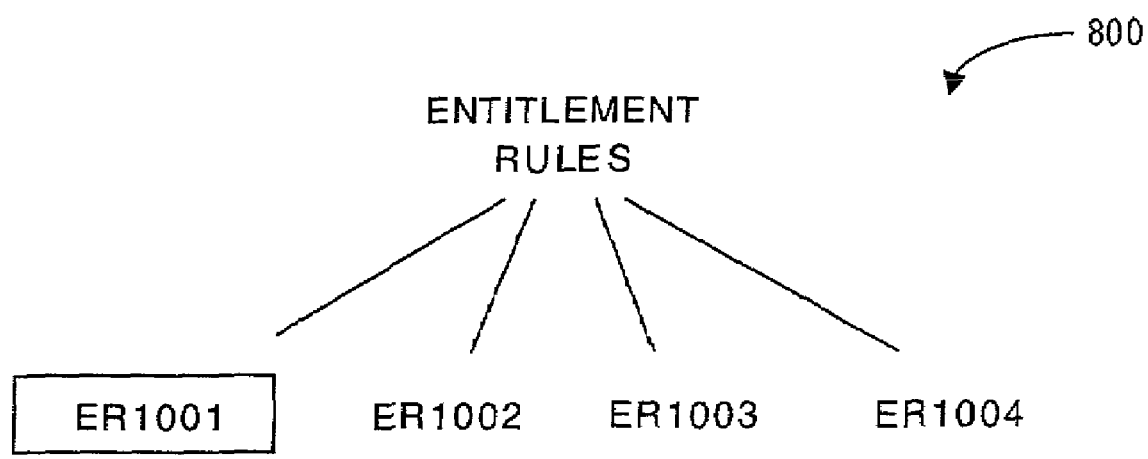
FIG. 8 illustrates an example of a tag domain and a set of entitlement rule tags according to one embodiment of the present invention.

According to some embodiments of the present invention, entitlement rules are associated with one or more entitlement tags and/or tag domains. For example, FIG. 8 illustrates an example of a tag domain 800 and a set of entitlement rule tag identifiers according to one embodiment of the present invention. As with document and content reader tags, an entitlement tag domain 800 may comprise a single-rooted, hierarchical data structure, including multi-level domain structures.

An entitlement tag and/or an entitlement rule may be associated with, for example, a content reader category. For example, an "institutional" content reader 20 might be allowed to access documents that other content readers 20 cannot. Similarly, an entitlement tag and/or an entitlement rule could be associated with a content reader region or a document category.

Referring again to FIG. 7, the content controller 900 arranges at 706 for the content reader 20 to receive information associated with the document. For example, the content controller 900 may transmit an indication of the document (e.g., a document identifier, title, or abstract) to the content reader 20. According to another embodiment, the content controller 900 transmits the document itself to the content reader 20.

Content Controller

Figure 9:
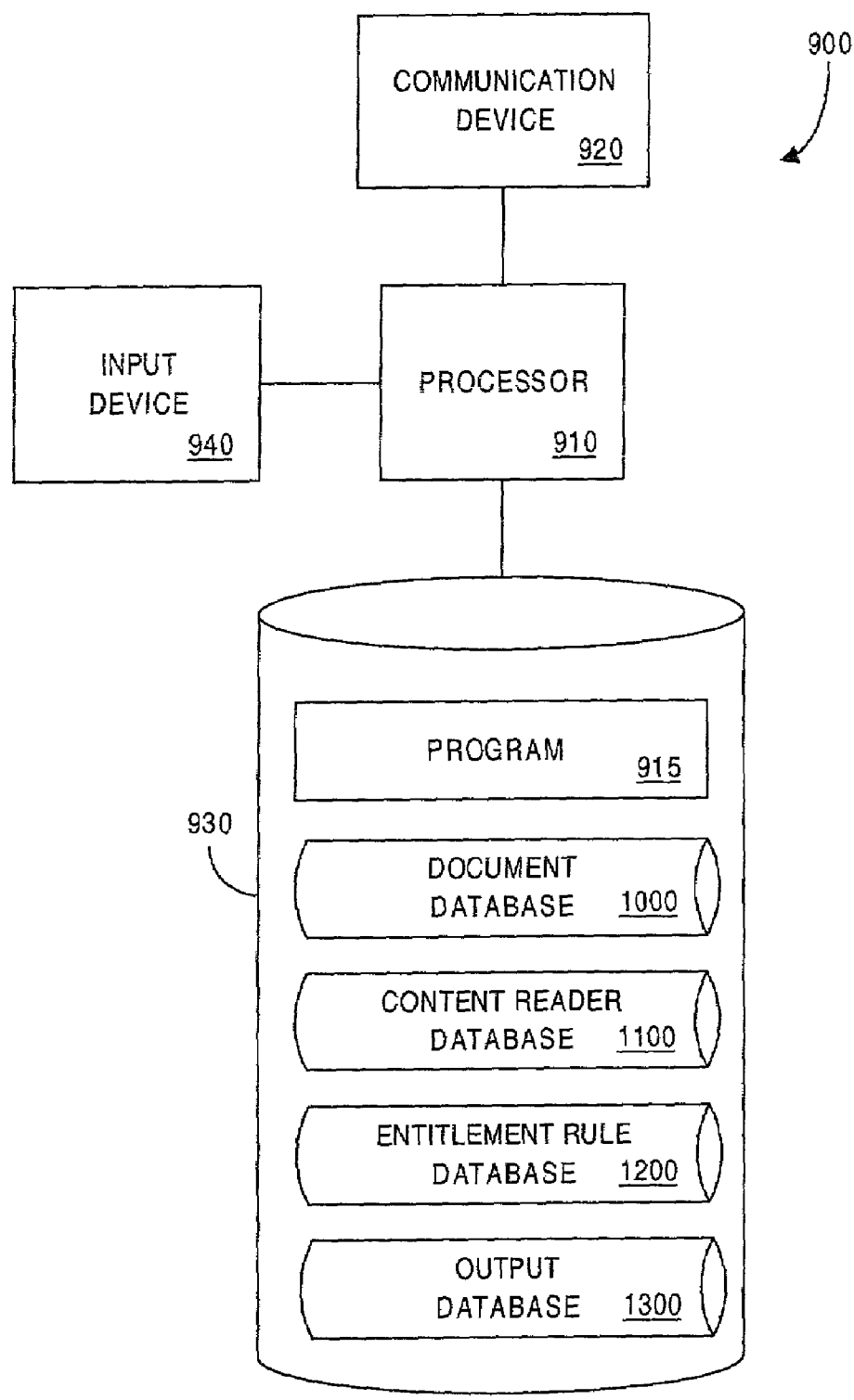
FIG. 9 is a block diagram of a content controller according to one embodiment of the present invention.

FIG. 9 illustrates a content controller 900 that is descriptive of the device shown, for example, in FIG. 1 according to an embodiment of the present invention. The content controller 900 comprises a processor 910, such as one or more INTEL® Pentium® processors, coupled to a communication device 920 configured to communicate via a communication network 30 (not shown in FIG. 9). The communication device 920 may be used to communicate, for example, with one or more content publishers 10, content readers 20, document storage devices 40, and/or payment services 50. According to one embodiment, the communication device 920 is also used to communicate with other content controllers 900.

The processor 910 is also in communication with an input device 940. The input device 940 may comprise, for example, a keyboard, a mouse or other pointing device, and/or a microphone. Such an input device 940 may be used, for example, to enter information about a entitlement rule and/or an entitlement tag.

The processor 910 is also in communication with a storage device 930. The storage device 930 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 930 stores a program 915 for controlling the processor 910. The processor 910 performs instructions of the program 915, and thereby operates in accordance with the present invention. For example, the processor 910 may determine a document tag associated with a document and a content selection tag associated with a content reader. The processor 910 may then arrange for the content reader to receive information associated with the document based on the document tag, the content selection tag, and at least one entitlement rule.

According to another embodiment, the processor 910 receives a document from a content publisher 10 and determines a document tag associated with the document. The processor 910 then determines an entitlement rule associated with the document.

As used herein, information may be "received" by or "transmitted" to, for example: (i) the content controller 900 from a content publisher 10 or a content reader 20; or (ii) a software application or module within the content controller 900 from another software application, module, or any other source.

As shown in FIG. 9, the storage device 930 also stores: a document database 1000 (described with respect to FIG. 10); a content reader database 1100 (described with respect to FIG. 11); an entitlement rule database 1200 (described with respect to FIG. 12); and an output database 1300 (described with respect to FIG. 13). Examples of databases that may be used in connection with the content management system 100 will now be described in detail with respect to FIGS. 10 through 13. The illustrations and accompanying descriptions of the databases presented herein are exemplary, and any number of other database arrangements could be employed besides those suggested by the figures.

Document Database

Figure 10:
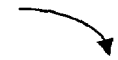
FIG. 10 is a tabular representation of a portion of a document database according to one embodiment of the present invention.

Referring to FIG. 10, a table represents the document database 1000 that may be stored at the content controller 900 according to an embodiment of the present invention. The table includes entries identifying documents that may be accessed via the content management system 100. The table also defines fields 1002, 1004, 1006, 1008 for each of the entries. The fields specify: a document identifier 1002, a description 1004, primary tags 1006, and secondary tags 1008. The information in the document database 1000 may be created and updated based on information received from content publishers 10.

The document identifier 1002 may be, for example, an alphanumeric code associated with a document that can be accessed via the content management system 100. The description 1004 may describe the contents of the document. According to one embodiment, the description 1004 includes text, graphical, and/or audio information that may be transmitted to a content reader 20 (e.g., to describe the content of the document to the content reader 20). According to another embodiment, the document itself (or a pointer to the document) is also stored in the document database 1000.

The primary tags 1006 and the secondary tags 1008 reflect the document tags that are currently assigned to the document. According to one embodiment, only a single set of document tags are stored for each document (e.g., there is no distinction between "primary" and "secondary" tags). According to another embodiment, each document tag is associated with a "weight." For example, a weight from 1 through 10 may be assigned to each document tag (instead of only categorizing document tags as primary or secondary).

Content Reader Database

Figure 11:
FIG. 11 is a tabular representation of a portion of a content reader database according to one embodiment of the present invention.

Referring to FIG. 11, a table represents the content reader database 1100 that may be stored at the content controller 900 according to an embodiment of the present invention. The table includes entries identifying content readers 20 who can access documents via the content management system 100. The table also defines fields 1102, 1104, 1106 for each of the entries. The fields specify: a content reader identifier 1102, a name 1104, and reader tags 1106. The information in the document database 1000 may be created and updated based on information received from content readers 20.

The content reader identifier 1102 may be, for example, an alphanumeric code associated with a content reader 20 who can access documents via the content management system 100. The content reader identifier 1102 may be generated by the content controller 900 or by the content reader 20 (e.g., when the content reader 20 provides a user name and password during a registration process). The name 1104 indicates the name of the content reader 20. Note that the content reader 20 may be, for example, an individual or an entity (e.g., an "ABC Pension Fund Manager").

The reader tags 1106 indicate information about the content reader 20 via one or more content reader tag domains (e.g., as described with respect to FIG. 5). For example, as illustrated by the third entry in FIG. 11, Robert Smith has a reader category tag of "employee."

The content reader database 1100 may also store a set of content selection tags that can be used to retrieve one or more documents that are likely to be of interest to each content reader 20. Such information may also include a relationship between content selection tags (e.g., Boolean relationships).

Entitlement Rule Database

Figure 12:
FIG. 12 is a tabular representation of a portion of an entitlement rule database according to one embodiment of the present invention.

Referring to FIG. 12, a table represents the entitlement rule database 1200 that may be stored at the content controller 900 according to an embodiment of the present invention. The table includes entries identifying rules that indicate content readers 20 who will (or will not) be allowed to access particular documents (or types of documents) via the content management system 100. The table also defines fields 1202, 1204, 1206, 1208 for each of the entries. The fields specify: an entitlement rule identifier 1202, a subject 1204, an action 1206, and a resource 1208. The information in the document database 1000 may be created and updated, for example, based on information received from an administrator associated with the content management system 100.

The entitlement rule identifier 1202 may be, for example, an alphanumeric code associated with a rule that indicates content readers 20 who will (or will not) be allowed to access particular documents (or types of documents) via the content management system 100.

The subject 1204 may indicate, for example, a group of content readers 20. For example, the subject 1204 may be based on one or more reader tags 1106 stored in the content reader database 1100 (e.g., all readers having a reader category tag of "institution").

The action 1206 may indicate, for example, that all content readers 20 identified by the subject 1204 are allowed to receive an indication of a document, receive the document itself, modify a document, and/or delete a document.

The resource may indicate, for example, at least one document. For example, the entitlement resource may be based on document identifier 1002, primary tags 1006, or secondary tags 1008 stored in the document database 1000 (e.g., all documents having a region tag of "Asia" as a primary tag 1006 or a secondary tag 1008).

Output Database

Referring to FIG. 13, a table represents the output database 1300 that may be stored at the content controller 900 according to an embodiment of the present invention. The table includes entries identifying documents that have been provided to content readers 20 via the content management system 100. The table also defines fields 1302, 1304, 1306, 1308 for each of the entries. The fields specify: an output identifier 1302, a content reader identifier 1304, an entitlement rule identifier 1306, and an output 1308. The information in the document database 1000 may be created and updated, for example, as content readers 20 access documents via the content management system 100.

The output identifier 1302 may be, for example, an alphanumeric code associated with a request to access documents received from a content reader 20. The content reader identifier 1304 identifies the content reader 20 who submitted the request (and who will receive the output in response to that request) and may be based on, or associated with, the content reader identifier 1102 stored in the content reader database 1100.

The entitlement rule identifier 1306 indicates one or more entitlement rules associated with the request and may be based on, or associated with, the entitlement rule identifier 1202 stored in the entitlement rule database 1200.

The output 1308 may indicate, for example, one or more documents that have been provided to the content reader 20 in response to his or her request. The output 1308 may be based on, or associated with, the document identifiers 1002 stored in the document database 1000.

Consider, for example, the first entry in the output database 1300. In this case, a request was received from content reader identifier "CR1002" (i.e., the ABC Pension Fund manager as indicated by the content reader database 1100). Because that content reader has a reader category tag of "institution" (i.e., as indicated by the associated reader tags 1106) two entitlement rules are satisfied (i.e., "ER1001" and "ER1002") and, as a result, two documents are output (i.e., "D1001" and "D1002") in response to the request.

Now consider the second entry in the output database 1300, which is associated with a request from content reader identifier "CR1001" (i.e., Alice Greene as indicated by the content reader database 1100). In this case, because Alice Greene has a reader category tag of "customer" (i.e., as indicated by the associated reader tags 1106) only one of the entitlement rules is satisfied (i.e., "ER1002") and, as a result, a single document is output (i.e., "D1002") in response to the request.

Content Management System Methods

Figure 14:
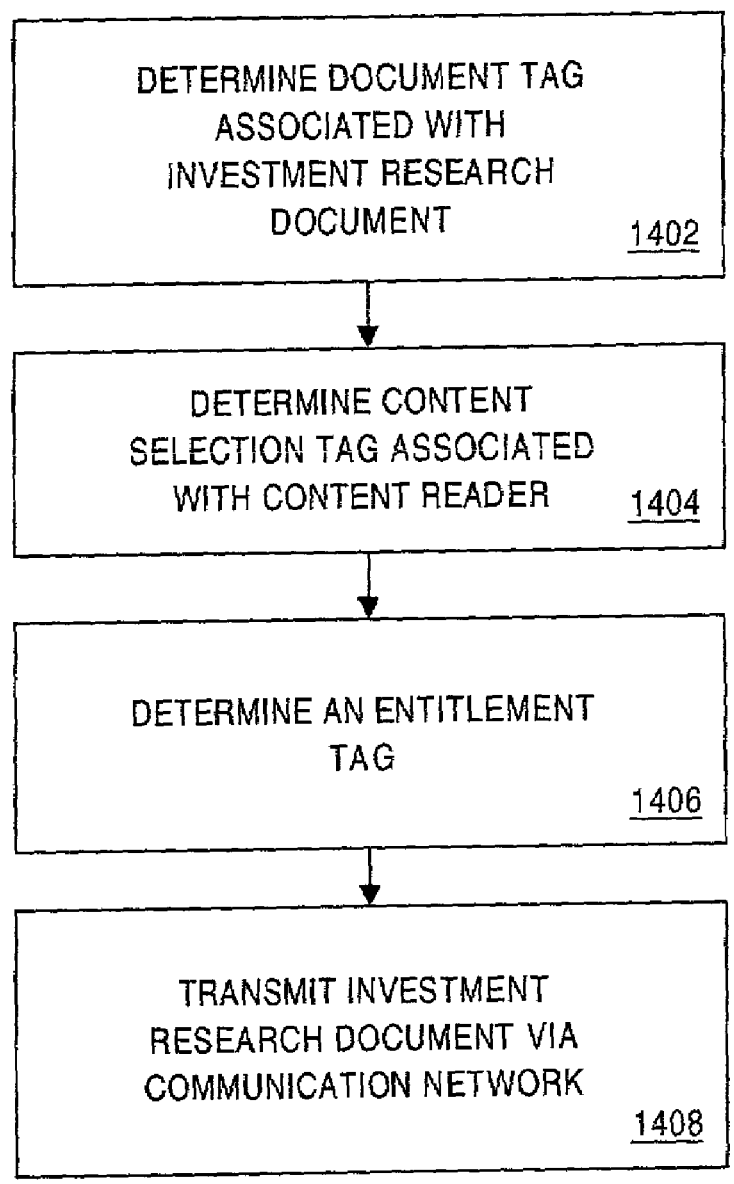
FIG. 14 is a flow chart of a computer-implemented method of facilitating access to investment research documents according to some embodiments of the present invention.

FIG. 14 is a flow chart of a computer-implemented method of facilitating access to investment research documents according to some embodiments of the present invention. The method may be performed, for example, by the content controller 900.

At 1402, a document tag associated with an investment research document is determined. For example, the content controller 900 may receive a document tag associated with a single-rooted, hierarchical data structure from the author (e.g., via a content publisher 10). The document tag may then be stored as a primary tag 1006 or a secondary tag 1008 in the document database 1000.

At 1404, a content selection tag associated with a content reader 20 is a determined. For example, the content controller 900 may receive a content selection tag associated with a single-rooted, hierarchical data structure from a content reader (e.g., via a display such as the one described with respect to FIG. 6).

At 1406, an entitlement tag associated with the investment research document, the document tag, the content reader, and/or a content reader tag is determined. For example, the content controller 900 may retrieve one or more entitlement tags or rules from the entitlement database 1200 based on the applicable resource 1208 and/or subject 1204. Note that such an entitlement tag or rule may not need to be disclosed to content readers 20.

At 1408, the investment research document is transmitted to the content reader 20 via a communication network 30 in accordance with the entitlement tag. For example, an entitlement engine in the content controller 900 may use the action 1206 stored in the entitlement rule database 1200 to determine if an investment research document may be accessed by a content reader 20. Note that such a process might select appropriate documents for a content reader 20 by solving for the intersection of multiple tag domains (e.g., document tag domains, content reader tag domains, and/or entitlement tag domains). After the investment research document is transmitted to the content reader 20, the output database 1300 is updated as appropriate.

Figure 15:
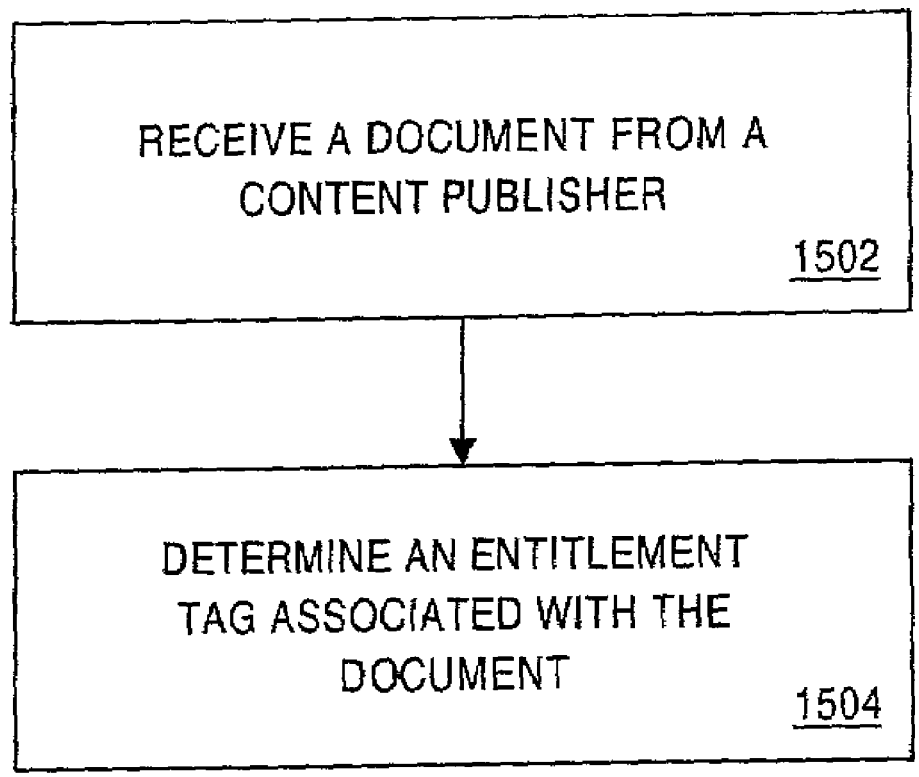
FIG. 15 is a flow chart of a method of determining an entitlement tag according to some embodiments of the present invention.

FIG. 15 is a flow chart of a method of determining an entitlement tag according to some embodiments of the present invention. At 1502, a document is received from a content publisher 10. For example, the content controller 900 may receive the document, or an indication of the document, from the content publisher 10. A document tag associated with the document may also be determined (e.g., via a display such as the one described with respect to FIG. 4).

At 1504, an entitlement rule associated with the document is determined. For example, the content controller 900 may receive an indication of the entitlement rule from the content publisher 10. According to another embodiment, the content controller 900 instead automatically determines the entitlement rule based on the content publisher 10, a document tag associated with the document, and/or a content of the document. In either case, the entitlement rule database 1200 may then be updated as appropriate.

Document Retrieval Method

As described here, a document may be associated with a set of document tags (e.g., one or more tags assigned by a content publisher 10). Moreover, a content reader 20 may be associated with a set of content selection tags. The set of content selection tags may comprise, for example, one or more tags selected by the content reader 20 or assigned to a category of content readers 20 (e.g., a set of content selection tags might indicate that all brokers should receive a monthly investment summary). In addition, a document and/or a content reader 20 may be associated with a set of entitlement tags.

According to some embodiments of the present invention, the content management system 100 facilitates access to such documents using bit vectors and/or hash tables. For example, for each document tag a list may be maintained indicating each set of content selection tags that references the document tag. Similarly, for each set of content selection tags a list may be maintained indicated each document tag included in the set.

When a new document is received by the content controller 900, the appropriate set of document tags are determined (e.g., the appropriate set of document tags may be received from the content publisher 10). For each of the document tags in the set, the content controller 900 may iterate through all of the sets of content selection tags referencing that tag. When a list of potential sets of content selection tags is established (i.e., including every set of content selection tags that might be satisfied by the new document), each set can be evaluated to determine if the new document satisfies all of the content selection tags in the set. According to another embodiment, a bit vector can be maintained (e.g., as wide as the number of content selector tag sets) to avoid having to evaluate a tag set more than once. Evaluation of entitlement tags may be handled in a similar manner. Such an approach may allow access to documents via the content management system 100 to be facilitated in an efficient and scalable way.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although many of the embodiments described herein are associated with documents that contain financial information, the present invention can also be used with respect to other types of information. For example, entitlement rules, tags, or tag domains may be associated with general news documents, entertainment information, and/or products that can be purchased by customers (e.g., advertisements).

Moreover, although many embodiments include a content controller 900 that retrieves and transmits documents, according to other embodiments these functions are instead performed by other devices (e.g., content publishers 10 and/or content readers 20 via a peer-to-peer protocol). According to another embodiment, the content controller 900 is associated with a third-party service (e.g., a service that organizes information for a number of different content providers).

Note that the relationships between documents and tag domains could be maintained in any number of ways. For example, one or more entitlement rules could be stored in a document database (i.e., instead of storing entitlement rules having an entitlement resource). Also note that entitlement tags may associated with existing information protocols, such as Extensible Markup Language (XML) protocols.

In still another embodiment, the content controller 900 receives a new entitlement rule, or an adjustment to a pre-existing entitlement rule. In this case, the content controller 900 may need to examine a number of existing documents and/or content readers 20 to determine the applicability of the new or adjusted rule. Similarly, the content controller 900 may receive information about a new content reader 20 (or an adjustment to information associated with a pre-existing content reader 20). In this case, the content controller 900 may need to examine a number of existing entitlement rules.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating access to financial documents, comprising:
   receiving information associated with a financial document;
   determining a document tag associated with the financial document based on the received information;
   automatically analyzing financial content of the financial document to determine an appropriate entitlement rule, including; (i) an entitlement subject associated with a group of content readers, (ii) an entitlement resource associated with at least one financial document, and (iii) an entitlement action associated with the entitlement subject and the entitlement resource, wherein the entitlement action indicates whether a content reader associated with the entitlement subject can receive the financial document without being able to modify the financial document;
   before a content selection tag associated with a requesting content reader is determined, evaluating the entitlement rule in connection with a plurality of content readers to generate an entitlement vector that indicates which of the content readers will be able to access information associated with the financial document;
   determining the content selection tag associated with the requesting content reader; and
   arranging for the requesting content reader to receive information associated with the financial document based on the entitlement vector and a bit vector representing at least one of: (i) the document tag and a plurality of content selection tag sets, or (ii) a content selection tag set and a plurality of document tags.

2. The method of claim 1, wherein the entitlement rule includes:
   an entitlement subject associated with a group of content readers.

3. The method of claim 1, wherein the entitlement rule includes:
   an entitlement resource associated with at least one financial document.

4. The method of claim 1, wherein the entitlement rule is associated with at least one entitlement tag.

5. The method of claim 4, wherein the entitlement tag is associated with at least one entitlement tag domain.

6. The method of claim 5, wherein the entitlement tag domain comprises a single-rooted, hierarchical data structure.

7. The method of claim 5, wherein the entitlement tag domain comprises a multi-level domain, and at least one domain level comprises a plurality of entitlement tags.

8. The method of claim 4, wherein the entitlement tag is associated with at least one of: (i) a content reader category, (ii) a content reader region, or (iii) a financial document category.

9. The method of claim 1, wherein said arranging comprises transmitting an indication of the financial document to the requesting content reader.

10. The method of claim 1, wherein said arranging comprises transmitting the financial document to the requesting content reader.

11. The method of claim 1, wherein the document tag is determined by retrieving information from a database.

12. The method of claim 1, wherein the document tag is determined by receiving information from a content publisher via a graphical user interface.

13. The method of claim 1, wherein the document tag comprises at least one of: (i) a primary tag, or (ii) a secondary tag.

14. The method of claim 1, wherein the content selection tag is determined by retrieving information from a database.

15. The method of claim 1, wherein content selection tag is determined by receiving information from the requesting content reader via a graphical user interface.

16. The method of claim 1, wherein said arranging is further based on a content reader tag.

17. The method of claim 1, wherein the financial document comprises content to be provided to a requesting content reader device via a communication network.

18. The method of claim 17, wherein the communication network comprises at least one of: (i) the Internet, (ii) an intranet, (iii) a public network, (iv) a public switched telephone network, (v) a proprietary network, (vi) a wireless network, or (vii) a local area network.

19. The method of claim 17, wherein the financial document comprises at least one of: (i) text content, (ii) image content, (iii) audio content, or (iv) executable content.

20. The method of claim 17, wherein the content comprises at least one of: (i) financial information, (ii) financial news, (iii) information about financial events, (iv) investment information, or (v) market information.

21. The method of claim 1, further comprising:
   transmitting the financial document to the requesting content reader.

22. The method of claim 21, wherein said transmitting is performed via at least one of: (i) a content controller, (ii) a content publisher, (iii) a content reader, (iv) a personal computer, (v) a server, (vi) a portable computing device, (vii) a wireless telephone, (viii) a Web site, or (ix) an electronic mail message.

23. An apparatus, comprising:
a processor; and
a storage device in communication with said processor and storing instructions adapted to be executed by said processor to:
  receive information associated with a financial document;
  determine a document tag associated with the financial document based on the received information;
  automatically analyze financial content of the financial document to determine an appropriate entitlement rule, including: (i) an entitlement subject associated with a group of content readers, (ii) an entitlement resource associated with at least one financial document, and (iii) an entitlement action associated with the entitlement subject and the entitlement resource, wherein the entitlement action indicates whether a content reader associated with the entitlement subject can receive the financial document without being able to modify the financial document;
  before a content selection tag associated with a requesting content reader is determined, evaluate the entitlement rule in connection with a plurality of content readers to generate an entitlement vector comprising a series of values that indicate which of the content readers will be able to access information associated with the financial document;
  determine the content selection tag associated with the requesting content reader; and
  arrange for the requesting content reader to receive information associated with the financial document based on the entitlement vector and a bit vector representing at least one of: (i) the document tag and a plurality of content selection tag sets, or (ii) a content selection tag set and a plurality of document tags.

24. The apparatus of claim 23, wherein said storage device further stores at least one of: (i) a document database, (ii) a content reader database, (iii) an entitlement rule database, or (iv) an output database.

25. The apparatus of claim 23, further comprising:
a communication device coupled to said processor and adapted to communicate with at least one of: (i) a content publishing device, (ii) a document storage device, (iii) a content controller, (iv) a content reader device, or (v) a payment device.

26. A medium storing instructions adapted to be executed by a processor to perform a method of facilitating access to financial documents, said method comprising:
  receiving information associated with a financial document;
  determining a document tag associated with the financial document based on the received information;
  automatically analyzing financial content of the financial document to determine an appropriate entitlement rule, including: (i) an entitlement subject associated with a group of content readers, (ii) an entitlement resource associated with at least one financial document, and (iii) an entitlement action associated with the entitlement subject and the entitlement resource, wherein the entitlement action indicates whether a content reader associated with the entitlement subject can receive the financial document without being able to modify the financial document;
  before a content selection tag associated with a requesting content reader is determined, evaluating the entitlement rule in connection with a plurality of content readers to generate an entitlement vector that indicates which of the content readers will be able to access information associated with the financial document;
  determining the content selection tag associated with the requesting content reader; and
  arranging for the requesting content reader to receive information associated with the financial document based on the entitlement vector and a bit vector representing at least one of: (i) the document tag and a plurality of content selection tag sets, or (ii) a content selection tag set and a plurality of document tags.

* * * * *